Sept. 14, 1943.   C. L. GARRISON   2,329,525
MOTORCYCLE TOWING DEVICE
Filed April 28, 1942
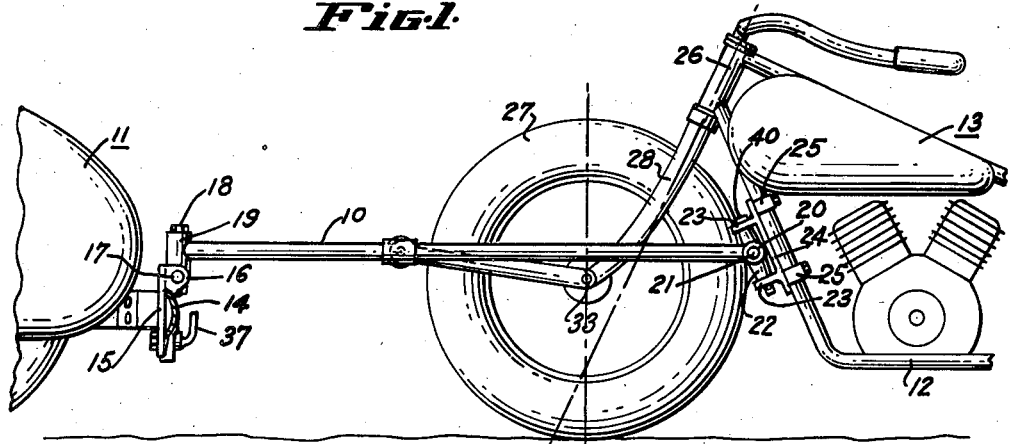
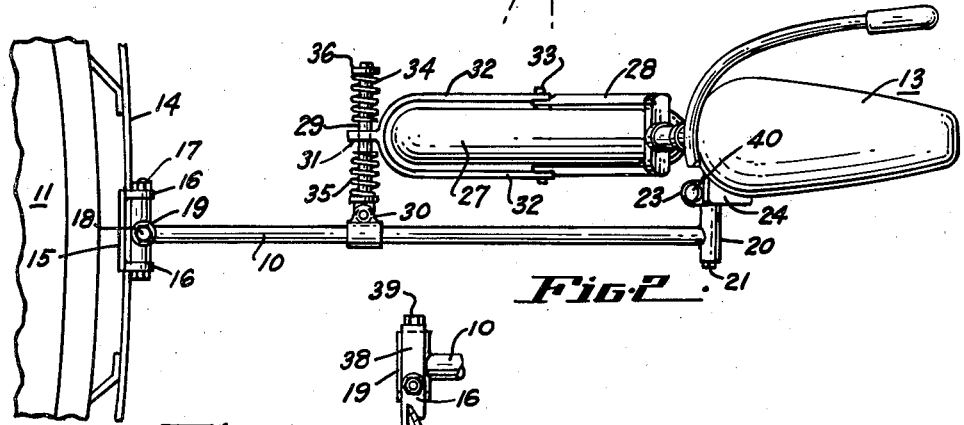
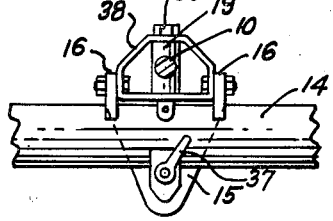
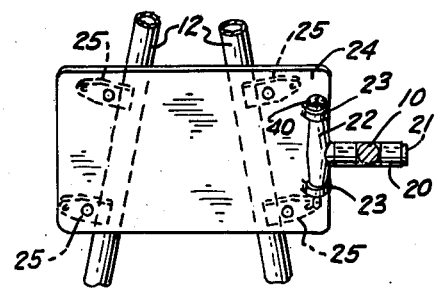
INVENTOR.
CHARLES L. GARRISON
BY
ATTORNEY.

Patented Sept. 14, 1943

2,329,525

UNITED STATES PATENT OFFICE 2,329,525

MOTORCYCLE TOWING DEVICE

Charles L. Garrison, San Francisco, Calif.

Application April 28, 1942, Serial No. 440,765

5 Claims. (Cl. 280—292)

My present invention relates to a device for towing motorcycles or bicycles behind a powered vehicle and more particularly to a novel towing arrangement in which the motorcycle or bicycle is towed in a self-steering and balancing manner.

An object of the invention is to provide a simple, practical and convenient means for towing a motorcycle or bicycle in a self-steering and balancing manner at the rear of a towed vehicle.

Another object of the invention is to provide a towing device for a motorcycle which in addition to exerting a pulling force upon the towed motorcycle will also operate when negotiating a curve to incline the towed motorcycle in the direction of said curve and cause it to thus steer itself and become self-balancing.

Another object of the invention is to provide a towing device for a solo motorcycle or bicycle which will operate to maintain the motorcycle or bicycle in a trailing manner without any shimmying or swaying when traveling at any speed which the roadway will permit.

Another object of the invention is to provide a towing arrangement for a motorcycle or bicycle which will prevent any undue jerking or bucking of the motorcycle or bicycle due to relative up and down movement between the towing and towed vehicles when negotiating a rough roadway.

Another object of the invention is to provide a towing device for motorcycle or bicycle which can be quickly and easily attached and detached from a towing vehicle and also from the motorcycle or bicycle in a simple and convenient manner.

At the present time because of the convenience in going from one place to another by automobile and particularly to points where motorcycling and bicycle riding can be indulged in either for sport or pleasure there has developed a demand for a means by which motorcycles and bicycles may be taken along without requiring that they be ridden to these points. For example, in the case of motorcycles used in competition the track is generally at some distance from the point of residence and to save the rider they are generally not ridden to the place where the competition is held. Bicycles also give added pleasure if they can be taken from the home to parks, beaches or other distant places without having to be ridden to these points. It is also the custom in garages having a call for and delivery service to provide an employe with a motorcycle that can be towed at the rear of an automobile being called for or delivered, but so far as I am aware, these motorcycles are now of the three-wheeled type, either of tricycle construction or are motorcycles having a sidecar attachment. While motorcycles of this character are satisfactory they are more expensive than a solo motorcycle and it is therefore a further object of the invention to provide a towing arrangement which will avoid the necessity for motorcycles of the three-wheeled or sidecar type.

Other objects and advantages of my invention will be in part evident to those skilled in the art and in part pointed out in connection with the accompanying drawing wherein there is shown by way of illustration and not of limitation a preferred embodiment of the invention.

In the drawing:

Figure 1 is a fragmentary side elevation showing the rear of a towing vehicle and a portion of a motorcycle as connected in towing relation with each other by a device constructed in accordance with a preferred embodiment of the invention.

Figure 2 is a fragmentary plan view of the device as illustrated in Figure 1 of the drawing.

Figures 3 and 4 are fragmentary views showing details of a modified form of an attaching device for use upon the rear bumper of a towing vehicle and, Figure 5 is a fragmentary detailed view showing a preferred type of means for attaching the towing device to the frame of a motorcycle or bicycle.

Upon referring to Figures 1 and 2 of the drawing it will be seen that my invention contemplates the use of a rigid tow bar, designated by the numeral 10, that is adapted to be connected between an automobile or other towing vehicle 11 and a frame portion 12 of a motorcycle designated generally by the numeral 13. The towbar 10 is preferably attached to a rear bumper 14 of an automobile. For this purpose the invention contemplates a platelike member 15 that may be firmly attached at any point along the rear bumper 14 and which carries spaced ears 16 between which a horizontally extended shaft or spindle 17 is journaled and from which there extends a vertical shaft 18 upon which the leading end of the towbar 10 is journaled by means of a bearing member 19 formed integrally thereupon. At its trailing end the towbar 10 has an integral horizontally disposed bearing member 20 that is journaled upon a horizontally extending shaft 21 which extends outwardly from a spindle 22 that is mounted to turn about a forwardly inclined axis. This spindle 22 is shown as journaled between ears 23 carried by plate 24 which is secured transversely upon the motorcycle frame 12 by means of suitable clamps 25. With this arrangement it will be seen that because of the vertically extending bearing 19 at its forward end and the horizontally extending bearing member 20 at its trailing end towbar 10 will be retained in torque sustaining relation between the towing vehicle 11 and the motorcycle frame 12.

At this point it should be noted that the horizontally extending shaft 21 and the forwardly inclined spindle 22 at the trailing end of the towbar 10 are disposed at a point rearwardly of the axis of a steering head 26 of the motorcycle frame 12. A further feature which is important to consider at this time is the fact that the point of contact of the front wheel 27 of the motorcycle with the roadway likewise occurs rearwardly of an extension of the axis about which the front wheel supporting forks 28 turn and therefore when a towing force is applied to the motorcycle frame with the towbar 10 this force will be transmitted through the forks 28 of the motorcycle to the front wheel 27, and since the wheel 27 is relatively free to turn as will be hereinafter explained it will tend to properly track behind the towing vehicle, and at the same time operate to maintain the motorcycle in balance.

Upon referring to Figure 2 of the drawing, it will be seen that the towbar 10 carries a laterally extending rod 29 which is hingedly mounted upon a clevis 30 so that it may swing a limited amount in a horizontal plane. This rod 29 passes freely through an eyelet 31 formed upon the forward part of a fork-like member 32 that is adapted to be sprung over the extending ends of a shaft 33 upon which the front wheel 27 of the motorcycle is mounted. The opening of the eyelet 31 is considerably larger than the diameter of the rod 29 and as a result it will slide more or less freely over the rod 29 without interfering with the normal balancing movement of the front wheel 27 after the towing vehicle and motorcycle have attained a suitable towing velocity. For safety and in order to prevent any abnormal displacement of the front wheel 27 such as might occur at low velocities as in starting or stopping or by obstacles in the roadway, the rod 20 also carries two oppositely arranged relatively light compression springs 34 and 35 against which the eyelet 31 is adapted to engage when the front wheel 27 is abnormally displaced. The spring 34 is retained upon the rod 29 by a collar 36 and the spring 35 is arranged to abut against the clevis 30 carried by the towbar 10.

Reference is now made to Figures 3 and 4 of the drawing for a detailed description of a modified form of means for attaching the towbar to the rear bumper 14 of the towing vehicle 11. As here shown the platelike member 15 with its overhanging spaced ears 16 is secured upon the bumper 14 by means of a clamping device which is held in place by a wrench-like member 37 that can be conveniently tightened and released to facilitate the attachment and removal of the plate 15 from the bumper 14. In this embodiment instead of the horizontally disposed spindle 17, the spaced ears 16 support a yoke-like member 38 that extends around the ends of the vertical bearing member 19 upon the towbar 10 and cooperating with a yoke-like member 38, there is a readily removable pin 39 which extends downwardly through the bearing member 19 to provide a vertical axis about which the towbar 10 is adapted to swing. With this arrangement it will be seen that the entire assembly may be detached from the bumper 14 or the towbar may be detached from the yoke-like member 38 by merely removing the vertical extending pin 39. At this point it should also be stated that the spindle 22 at the trailing end of the towbar 10 is preferably journaled upon a pin 40 which can be likewise easily withdrawn to permit a detachment of the towbar 10 from the motorcycle. As a result when the ends of the fork-like member 32 are disengaged from the shaft 33, the towbar with the fork-like member 32 can be completely removed from the motorcycle and the towing vehicle.

As illustrated in Figure 5 of the drawing of the motorcycle frame 12 has two downwardly extending tubular portions to which the plate 24 is attached by the clamps 25. When the plate 24 is thus secured upon the frame 12 it will be seen that the spindle 22 will be secured in fixed relation with the longitudinal axis of the motorcycle. The problem of securing the plate 24 to the frame 12 as here shown is a relatively simple matter whereas if the frame 12 has only a single outwardly extending frame portion at this point it will be necessary to secure the plate 24 thereto in an immovable manner as for example by welding.

While the exact nature of the forces exerted through the towbar 10 from the towing vehicle 11 to the motorcycle 13 are not fully understood it is believed that the operation of the invention can be explained by the following: If it is first assumed that the spindle 22 at the trailing end of the towbar 10 is mounted upon the motorcycle frame 12 so that it can turn about a vertical axis it will be seen that the tracking of the motorcycle in proper trailing relation will be dependent upon the ability of the front wheel 27 to maintain itself in line with the direction of the movement of the motorcycle. In such an arrangement the towbar 10 will be required to also maintain the motorcycle in a substantially vertical upright position and while such an arrangement might operate satisfactorily when the towing operation is continuously in a straight line, it will be readily seen that if a change occurs in the direction of the towing operation the front wheel of the motorcycle will continue to steer in a straight line until the eyelet 31 upon the fork-like member 32 comes into engagement with either of the springs 34 and 35 upon the rod 29. However, when the spindle 22 is inclined forwardly at an angle relative to the horizontal line of the applied towing force as is contemplated by the present invention the tendency for the motorcycle to continue in a straight line after the towbar 10 has moved sidewise in the direction of a turn will be effectively counteracted. This may be explained by the fact that when the towbar 10 is directed to the right or to the left and out of parallel relation with the longitudinal axis of the motorcycle the spindle 22 at the trailing end thereof will also be moved out of its vertical plane and as a result the motorcycle frame will be inclined to the right or to the left depending upon the direction in which the towbar is swung by the towing vehicle 11. From this it will be seen that the inclination of the motorcycle frame 12 will be proportional to the sharpness of the turn being made. In other words when traveling in a wide sweeping curve the inclination of the motorcycle frame will be very slight whereas in the event of a sharp turn the inclination of the motorcycle frame will be considerably greater. In this way the inclining or leaning of the motorcycle in the direction of the curve is maintained at a point where the unbalanced weight of the motorcycle is sufficient to counteract the centrifugal force and as a result the front wheel 27, due to its trailing contact with the roadway will be caused to assume its normal steering and balancing position with respect to the steering head 26 of the motorcycle 13. In extreme cases as when traveling at high speeds the centrifugal force created in negotiating curves will act, through the trailing contact of the front wheel 27 with the roadway, to steer the front wheel outwardly on the curve and thus compress one or the other of the springs 34 or 35. This will further increase the angle between the central line of the towbar 10 and the longitudinal axis of the motorcycle 13 and this will further increase the leaning of the motorcycle in the direction of the curve being negotiated. This additional leaning of the motorcycle will counteract the centrifugal force acting at the trailing point of contact between the front wheel 27 and the roadway and thus further insure a balance between the centrifugal force and the leaning weight of the motorcycle 13. As a further means to control the leaning tendencies of the motorcycle as in negotiating curves it is also conceivable that the axis of the bearing forming member 19 might be disposed at an outwardly inclining angle with respect to the towing vehicle 11. When this additional provision is made it will be seen that the leading end of the towbar 10 is moved to the right or left in a horizontal plane and while at the same time exerting a towing force a slight turning torque will also be exerted through the towbar 10 which will tend to increase the leaning characteristics of the motorcycle 13. The connection of the towbar 10 between towing vehicle 11 and the motorcycle frame 12 by means of the two horizontally disposed shafts 17 and 21 permits the motorcycle to rock relative to the towing vehicle in traveling over rough roads without undue disturbance and because of the substantially horizontal disposition of the towbar 10 all tendency for the motorcycle to buck or oscillate back and forth is eliminated.

While I have, for the sake of clearness and in order to disclose the invention so that the same can be readily understood, described and illustrated specific devices and arrangements, I desire to have it understood that this invention is not limited to the specific means disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In a device for towing a motorcycle or bicycle in a self-balancing manner behind a towing vehicle, the combination of a single rigid towing bar adapted to extend rearwardly from the towing vehicle and along one side of and parallel to the longitudinal axis of a motorcycle or bicycle, means carried by the motorcycle or bicycle frame to which said towbar is attached at a point rearwardly of the front wheel steering head, said towbar being connected against tortional rotation at its leading end to the towing vehicle with freedom of movement only in a substantially horizontal and a vertical plane and connected at its trailing end to said means carried by the motorcycle or bicycle frame with freedom of movement about a horizontal axis and about a relatively fixed axis inclined forwardly of a vertical line passing through said horizontal axis, whereby upon lateral displacement of the leading end of said towbar as in negotiating a curve said frame will be inclined from its normal vertical position in the direction of said lateral displacement of the leading end of the towbar and thus cause the front wheel to swing in the direction of the turn and effect a normal balancing and steering of the towed motorcycle or bicycle.

2. In a device for towing a motorcycle in a self-balancing manner behind a towing vehicle, the combination of a single rigid towbar adapted to extend rearwardly from a towing vehicle and along one side of and parallel to the longitudinal axis of the motorcycle, a towbar support carried by the motorcycle frame to which said towbar is attached at a point rearwardly of the front wheel steering head, said towbar being connected at its leading end to the vehicle against tortional rotation but with freedom to swing in a substantially horizontal plane and rock in a vertical plane and being connected at its trailing end to said towbar support with freedom to rock in the vertical plane and also turn about an axis inclined forwardly of a vertical line passing through its point of attachment to said towbar support, whereby any lateral swinging movement of said towbar as in negotiating a curve will incline said motorcycle frame from its vertical position in the direction of the swinging movement of said towbar and thus cause the front wheel to be inclined in the same direction to effect a normal balancing and steering of the motorcycle.

3. In a device for towing a motorcycle or bicycle in a self balancing manner behind a towing vehicle, the combination of a single rigid torque sustaining towbar attached to and extending rearwardly from a towing vehicle along one side of the longitudinal axis of a motorcycle or bicycle, means for attaching said towbar without tortional rotation to the towing vehicle but with freedom of movement in two planes at right angles to each other, means at the trailing end of said towbar extending outwardly at one side of the motorcycle or bicycle frame, a spindle journaled upon said means about an axis inclined forwardly and behind the steering head of the motorcycle or bicycle frame and having a horizontally projecting shaft intermediate its ends to which the trailing end of said towbar is journaled, whereby upon a change in the towing angle of said towbar said spindle will operate to incline the motorcycle or bicycle frame in the direction of said change in the towing angle of said towbar and thus cause the front wheel of the motorcycle or bicycle to swing in a similar direction to effect a balancing and steering of the motorcycle or bicycle by its front wheel.

4. In a device for towing a motorcycle or bicycle of conventional construction in a self-balancing manner behind a towing vehicle, the combination of a single rigid towbar adapted to extend rearwardly from a towing vehicle along one side of and parallel to the longitudinal axis of the towed motorcycle or bicycle, a towbar support secured to and extending outwardly at one side of the motorcycle or bicycle frame at a point to one side and rearwardly of the steering head to which said towbar is attached to rock in a vertical plane, said rigid towbar being connected against tortional rotation to the towing vehicle at its leading end but with feedom of movement in a substantially horizontal and a vertical plane and at its trailing end to said towbar support with freedom of movement about a horizontal axis and about an intersecting axis inclined forwardly in a vertical plane, whereby upon lateral displacement the leading end of said towbar as in negotiating a curve said motorcycle or bicycle frame will be inclined in the direction of said lateral displacement and thus cause a normal balancing and steering of the motorcycle or bicycle by its front wheel, and means extending forwardly from the axle of the front wheel yieldingly attached to said towbar intermediate its ends for preventing an excessive turning of said front wheel before a normal self balancing velocity is attained as in starting the towing operation.

5. In a device for towing a motorcycle in a self balancing manner behind a towing vehicle, the combination of a plate-like member adapted to be secured upon a motorcycle frame rearwardly of and below its front wheel steering head, means for securing said plate-like member upon the motorcycle frame with a portion extending outwardly at one side thereof, a spindle journaled upon the extending end of said plate-like member and turnable about an axis inclined forwardly, an outwardly extending bearing shaft formed integrally with said spindle and providing a horizontal axis for the trailing end of a towbar, and a rigid torque sustaining towbar journaled upon said shaft, whereby upon a swinging of said towbar as in making a turn said motorcycle frame will be inclined in the direction of said turn to effect a normal balancing and steering movement of the front wheel of the motorcycle.

CHARLES L. GARRISON.